United States Patent
Gupta et al.

(10) Patent No.: US 12,513,165 B2
(45) Date of Patent: Dec. 30, 2025

(54) SYSTEM AND METHOD TO DETECT DATA LEAKS VIA A DISTRIBUTED DATA ORCHESTRATION APPARATUS AND TRANSMITTED FABRICATED DATA RESPONSES

(71) Applicant: BANK OF AMERICA CORPORATION, Charlotte, NC (US)

(72) Inventors: Saurabh Gupta, New Delhi (IN); Amit Bhandari, Uttarakhand (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 131 days.

(21) Appl. No.: 18/504,914

(22) Filed: Nov. 8, 2023

(65) Prior Publication Data

US 2025/0150465 A1 May 8, 2025

(51) Int. Cl.
 *G06F 15/16* (2006.01)
 *G06F 9/54* (2006.01)
 *H04L 9/40* (2022.01)
 *H04L 29/06* (2006.01)

(52) U.S. Cl.
 CPC ............... *H04L 63/1416* (2013.01)

(58) Field of Classification Search
 CPC .................................. H04L 63/1416
 USPC ................................................ 726/23
 See application file for complete search history.

(56) References Cited

U.S. PATENT DOCUMENTS

| | | | | |
|---|---|---|---|---|
| 7,313,661 | B1* | 12/2007 | Dmitriev | G06F 12/0253 711/170 |
| 7,516,476 | B1* | 4/2009 | Kraemer | G06F 21/604 726/1 |
| 7,891,000 | B1 | 2/2011 | Rangamani | |
| 9,516,044 | B2 | 12/2016 | Lietz | |
| 9,576,119 | B2 | 2/2017 | McGeehan | |
| 9,742,794 | B2 | 8/2017 | Cabrera | |
| 9,811,667 | B2 | 11/2017 | Hugard, IV | |
| 11,265,323 | B2* | 3/2022 | Johnson | H04L 63/1491 |

(Continued)

OTHER PUBLICATIONS

Blockchain basics: Introduction to distributed ledgers, By Sloane Brakeville, Bhargav Perepa https://developer.ibm.com/tutorials/cl-blockchain-basics-intro-bluemix-trs/ (Year: 2019).*

*Primary Examiner* — Hamza N Algibhah
(74) *Attorney, Agent, or Firm* — Moore & Van Allen PLLC; Nicholas C. Russell

(57) ABSTRACT

Systems, computer program products, and methods are described herein for detecting data leaks via a distributed data orchestration apparatus and transmitted fabricated data responses. The present disclosure is configured to: create a plurality of fabricated data accounts within a set of network servers, where the plurality of fabricated data accounts are connected to an account monitoring engine; collect a set of transmitted fabricated data responses from the plurality of fabricated data accounts; analyze the collected set of transmitted fabricated data responses via an orchestration apparatus; determine the root cause of the data leak associated with the plurality of fabricated data accounts via the orchestration apparatus; and locate a geographic source of the data leak associated with the plurality of fabricated data accounts via a breach engine, where the geographic source of the data leak is located through the root cause of the data leak.

20 Claims, 10 Drawing Sheets

(56) References Cited

U.S. PATENT DOCUMENTS

| | | | |
|---|---|---|---|
| 11,882,145 B2 | 1/2024 | Colquhoun | |
| 2008/0229421 A1* | 9/2008 | Hudis | G06F 21/552 |
| | | | 726/25 |
| 2009/0276106 A1 | 11/2009 | Doan | |
| 2010/0235918 A1* | 9/2010 | Mizrahi | H04L 63/168 |
| | | | 726/25 |
| 2011/0066562 A1* | 3/2011 | Stapleton | G06Q 10/00 |
| | | | 705/317 |
| 2013/0263226 A1* | 10/2013 | Sudia | H04L 63/08 |
| | | | 726/4 |
| 2016/0094580 A1* | 3/2016 | Handel | H04L 63/1408 |
| | | | 726/23 |
| 2016/0112451 A1* | 4/2016 | Jevans | G06F 21/56 |
| | | | 726/25 |
| 2018/0330122 A1* | 11/2018 | Margalit | H04L 63/1408 |
| 2019/0081963 A1* | 3/2019 | Waghorn | G06F 21/552 |
| 2020/0019648 A1* | 1/2020 | Shanmugam | G06F 11/0709 |
| 2020/0053121 A1* | 2/2020 | Wilcox | G06F 40/205 |
| 2021/0089657 A1* | 3/2021 | Dunjic | G06F 21/52 |
| 2021/0203673 A1* | 7/2021 | dos Santos | H04L 63/1433 |
| 2022/0159029 A1 | 5/2022 | Bendersky | |
| 2022/0210200 A1 | 6/2022 | Crabtree | |
| 2022/0321595 A1 | 10/2022 | Colquhoun | |
| 2023/0164173 A1* | 5/2023 | Verbus | G06F 21/552 |
| | | | 726/22 |
| 2023/0332976 A1* | 10/2023 | Chen | F17D 5/02 |

* cited by examiner

SYSTEM AND METHOD TO DETECT DATA LEAKS VIA A DISTRIBUTED DATA ORCHESTRATION APPARATUS AND TRANSMITTED FABRICATED DATA RESPONSES

TECHNOLOGICAL FIELD

Example embodiments of the present disclosure relate to detecting data leaks via a distributed data orchestration apparatus and transmitted fabricated data responses.

BACKGROUND

Locating and diagnosing data leaks is critical to data security, as methods of maliciously obtaining data continue to evolve. Tracking and diagnosing the source of data leaks may be difficult without experiencing said data leak within a given network.

Applicant has identified a number of deficiencies and problems associated with detection of data leaks via a distributed data orchestration apparatus and transmitted fabricated data responses. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for detecting data leaks via a distributed data orchestration apparatus and transmitted fabricated data responses.

In an example embodiment, a system for detecting data leaks via a distributed data orchestration apparatus and transmitted fabricated data responses is provided. In some embodiments, the system may comprise: a memory device with computer-readable program code stored thereon; at least one processing device coupled to the at least one non-transitory storage device, wherein the at least one processing device is configured to: create a plurality of fabricated data accounts within a set of network servers, wherein the plurality of fabricated data accounts are connected to an account monitoring engine, wherein the plurality of fabricated data accounts are exposed within the set of network servers; collect a set of transmitted fabricated data responses from the plurality of fabricated data accounts, wherein the plurality of transmitted fabricated data responses are mapped within the account monitoring engine; analyze the collected set of transmitted fabricated data responses via an orchestration apparatus, wherein analysis via the orchestration apparatus determines a data leak associated with the plurality of fabricated data accounts; determine a root cause of the data leak associated with the plurality of fabricated data accounts via the orchestration apparatus; and locate a geographic source of the data leak associated with the plurality of fabricated data accounts via a breach engine, wherein the geographic source of the data leak is located using the root cause of the data leak associated with the plurality of fabricated accounts.

In some embodiments, wherein the set of transmitted fabricated data responses from the plurality of fabricated data accounts are recorded within a distributed ledger application.

In some embodiments, the account monitoring engine stores interactions associated with the plurality of fabricated data accounts.

In some embodiments, determining the root cause of the data leak associated with the plurality of fabricated data accounts via the orchestration apparatus comprises analyzing a set of network clusters and patching patterns to predict the source of the data leak associated with the fabricated data accounts.

In some embodiments, determining the root cause of the data leak further comprises updating a set of predefined security rules associated with data storage within the set of network servers.

In some embodiments, the plurality of fabricated data accounts within the set of network servers are recreated in a star topology format.

In some embodiments, the set of transmitted fabricated data responses comprise emails, messages, and attempted calls using data associated with the plurality of fabricated data accounts.

In another example embodiment, a computer program product for detecting data leaks via a distributed data orchestration apparatus and transmitted fabricated data responses is provided. The computer program product may comprise at least one non-transitory computer-readable medium having computer-readable program code portions embodied therein, the computer-readable program code portions comprising: an executable portion configured to create a plurality of fabricated data accounts within a set of network servers, where the plurality of fabricated data accounts are connected to an account monitoring engine, where the plurality of fabricated data accounts are exposed within the set of network servers; an executable portion configured to collect a set of transmitted fabricated data responses from the plurality of fabricated data accounts, where the plurality of transmitted fabricated data responses are mapped within the account monitoring engine; an executable portion configured to analyze the collected set of transmitted fabricated data responses via an orchestration apparatus, where analysis via the orchestration apparatus determines a data leak associated with the plurality of fabricated data accounts; an executable portion configured to determine a root cause of the data leak associated with the plurality of fabricated data accounts via the orchestration apparatus; an executable portion configured to locate a geographic source of the data leak associated with the plurality of fabricated data accounts via a breach engine, where the geographic source of the data leak is located using the root cause of the data leak associated with the plurality of fabricated data accounts.

In some embodiments, the set of transmitted fabricated data responses from the plurality of fabricated data accounts are recorded within a distributed ledger application.

In some embodiments, the account in monitoring engine stores interactions associated with the plurality of fabricated data accounts.

In some embodiments, determining the root cause of the data leak associated with the fabricated data accounts via the orchestration apparatus comprises analyzing a set of network clusters and patching patterns to predict the source of the data leak associated with the fabricated data accounts.

In some embodiments, determining the root cause of the data leak further comprises updating a set of predefined security rules associated with data storage within the set of network servers.

In some embodiments, the plurality of fabricated data accounts within the set of network servers are created in a star topology format.

In some embodiments, the set of transmitted fabricated data responses comprise emails, messages, and attempted calls using data associated with the plurality of fabricated data accounts.

In another example embodiment, a computer-implemented method to detect data leaks via a distributed data orchestration apparatus and transmitted fabricated data responses, the method comprising: creating a plurality of fabricated data accounts within a set of network servers, where the plurality of fabricated data accounts are connected to an account monitoring engine, where the plurality of fabricated data accounts are exposed within the set of network servers; collecting a set of transmitted fabricated data responses from the plurality of fabricated data accounts, where the plurality of fabricated data responses are mapped within the account monitoring engine; analyzing the collected set of transmitted fabricated data responses via an orchestration apparatus, where analysis via the orchestration apparatus determines a data leak associated with the plurality of fabricated data accounts; determining the root cause of the data leaks associated with the plurality of fabricated data accounts via the orchestration apparatus; and locating a geographic source of the data leak associated with the plurality of fabricated data accounts via a breach engine, where the geographic source of the data leak is located using the root cause of the data leak associated with the plurality of fabricated accounts.

In some embodiments, the set of transmitted fabricated data responses from the plurality of fabricated data accounts are recorded within a distributed ledger application.

In some embodiments, the account monitoring engine stores interactions associated with the plurality of fabricated data accounts.

In some embodiments, determining the root cause of the data leak further comprises updating a set of predefined security rules associated with data storage within the set of network servers.

In some embodiments, the plurality of fabricated data accounts within the set of network servers are created in a star topology format.

In some embodiments, the set of transmitted fabricated data responses comprise emails, messages, and attempted calls using data associated with the plurality of fabricated data accounts.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
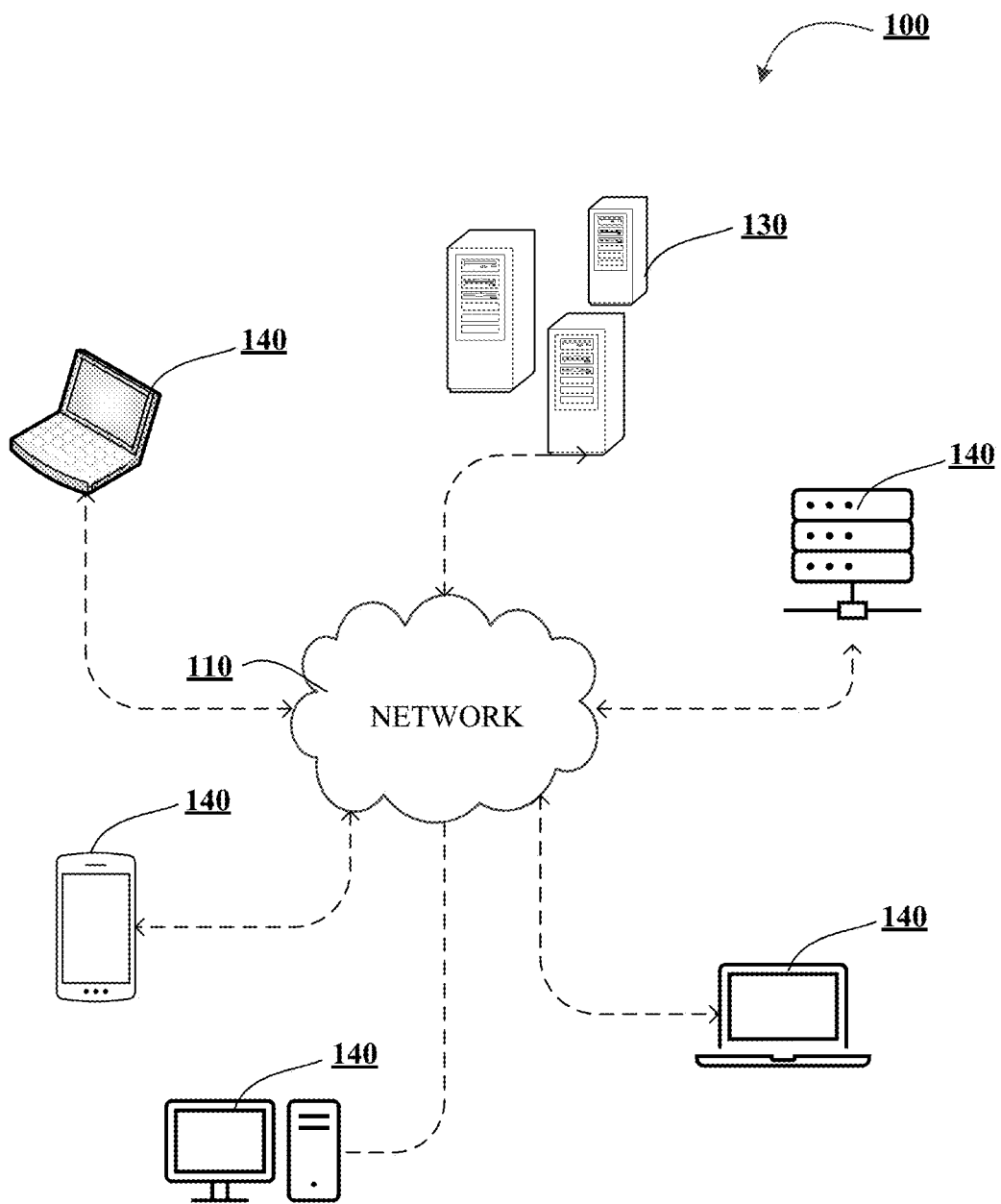
Figure 1B:
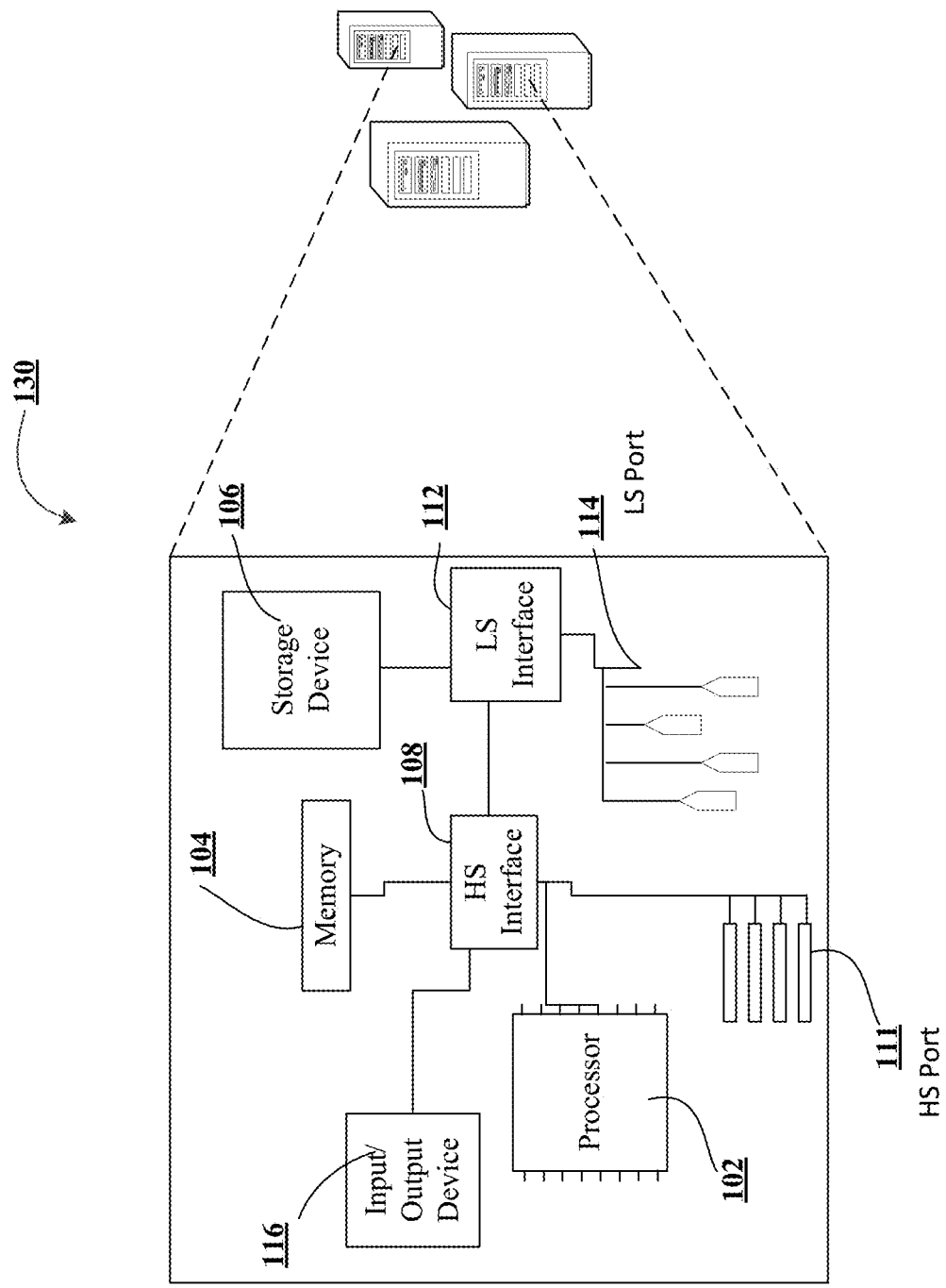
Figure 1C:
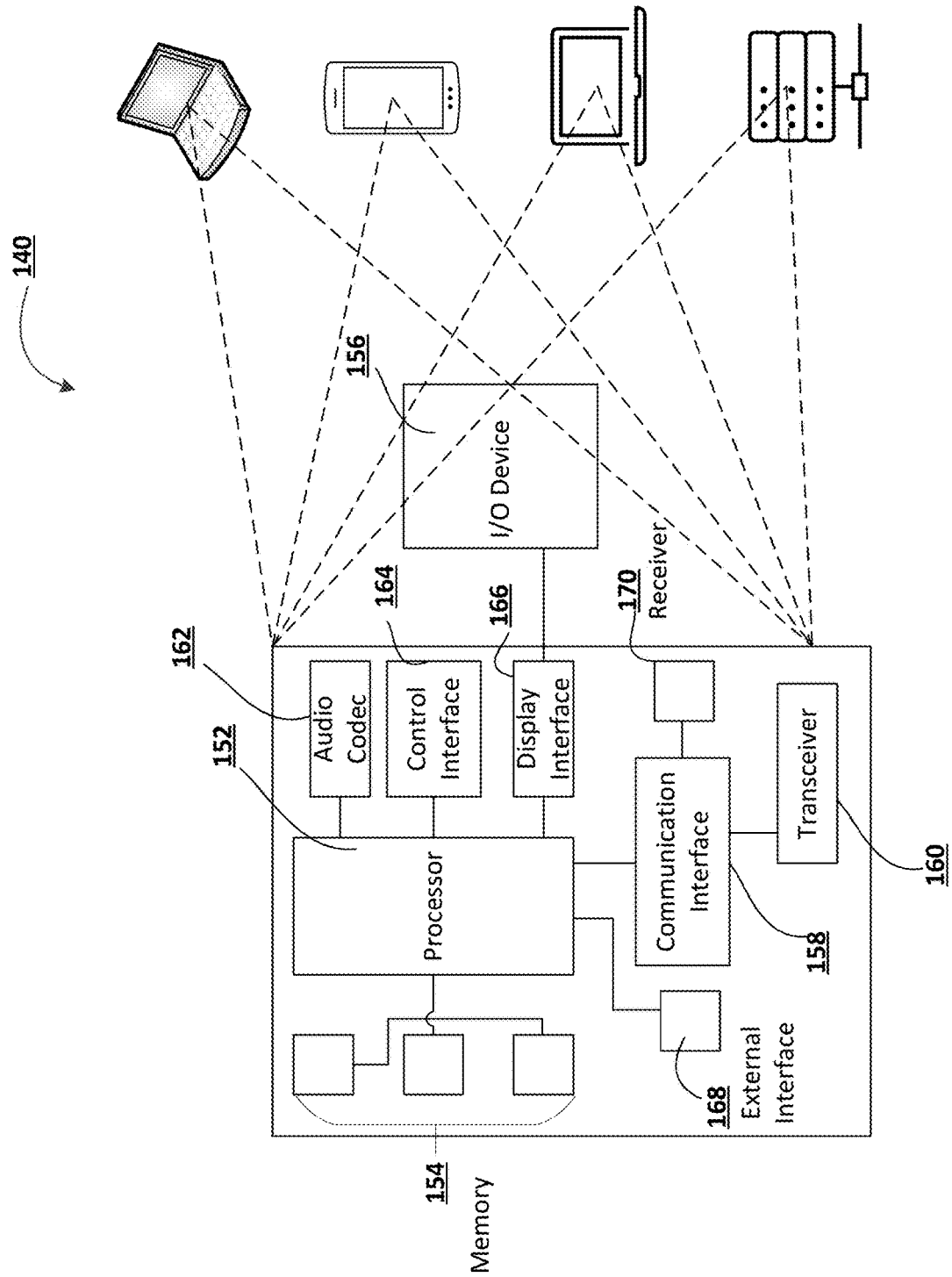
Figure 2A:
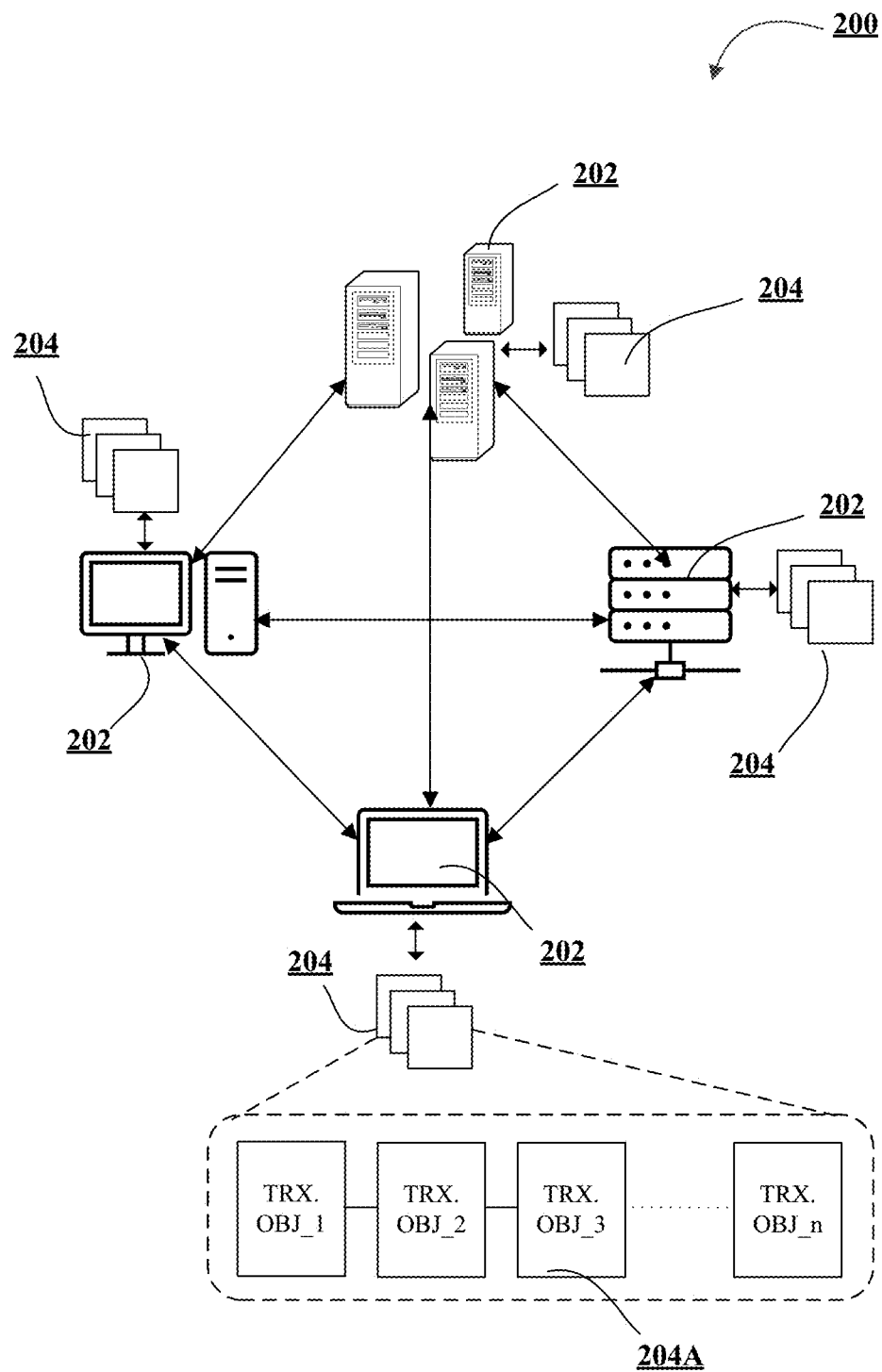
Figure 2B:
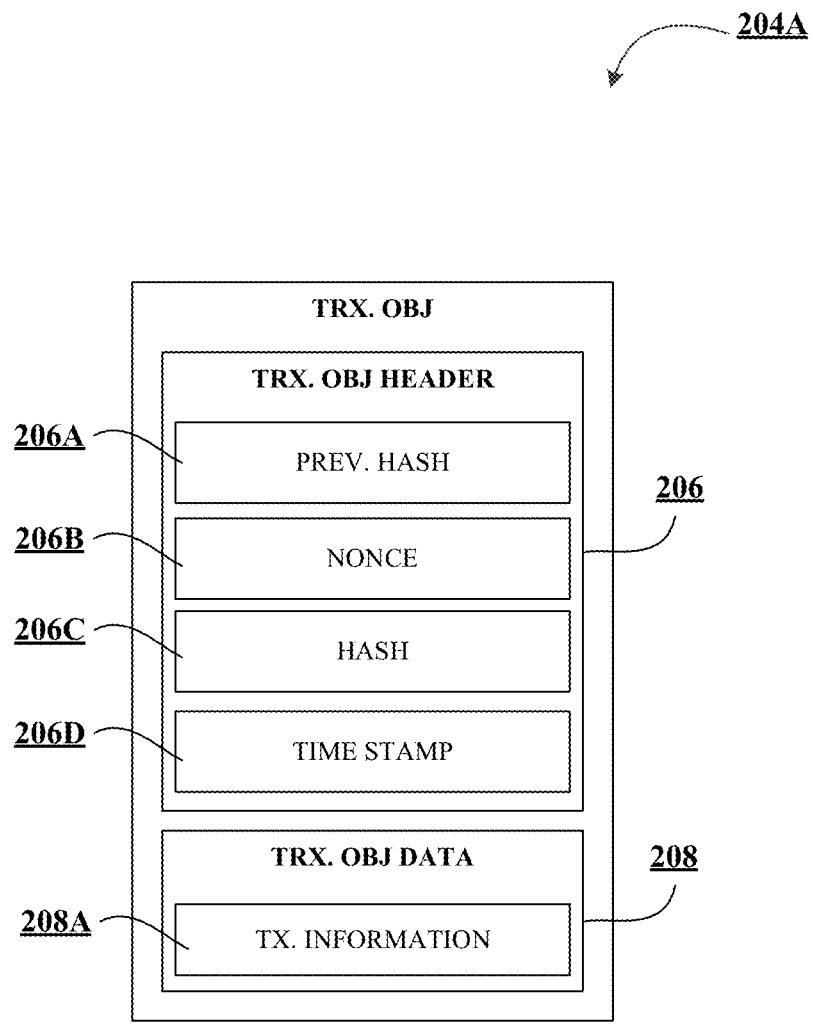
Figure 3:
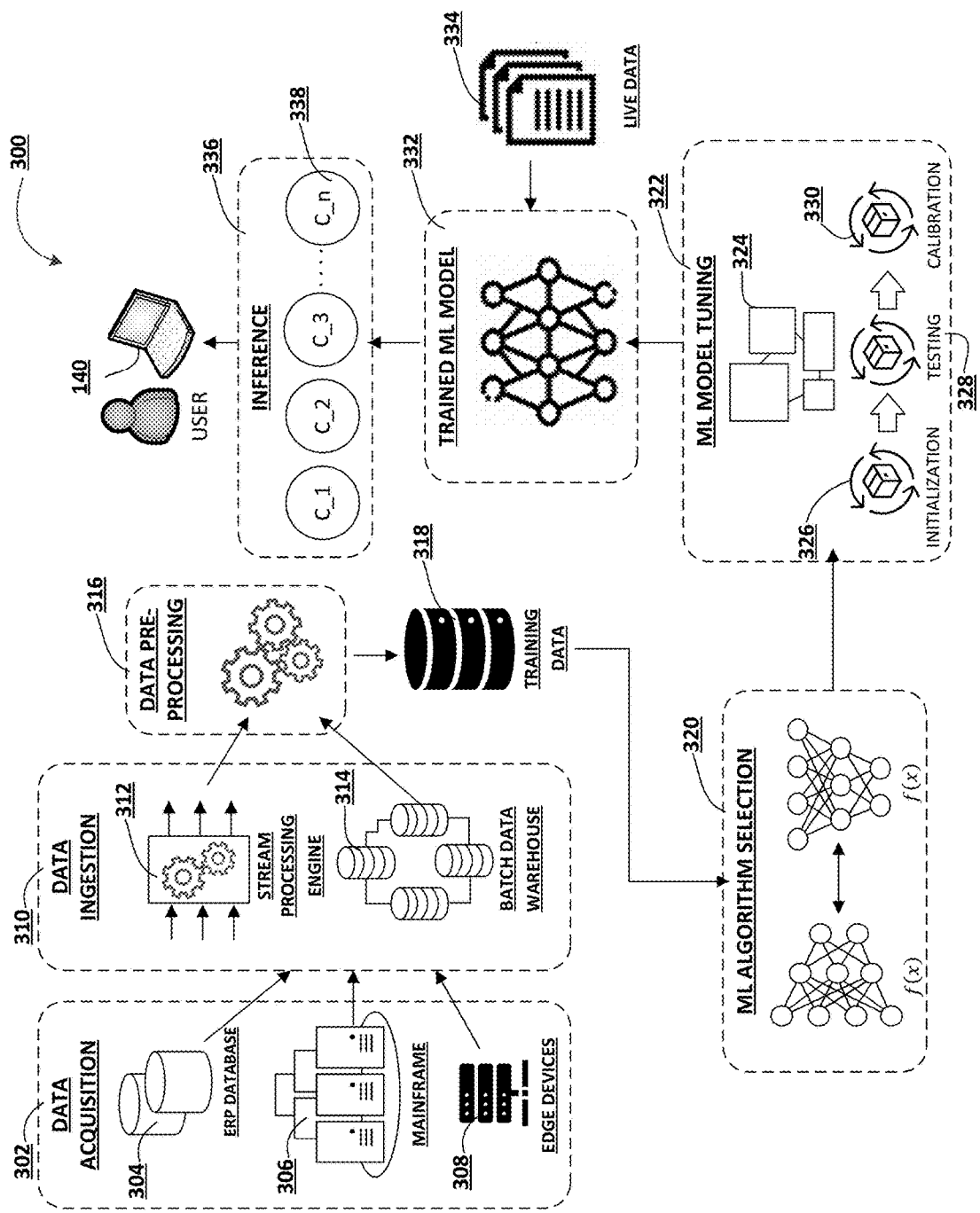
Figure 4:
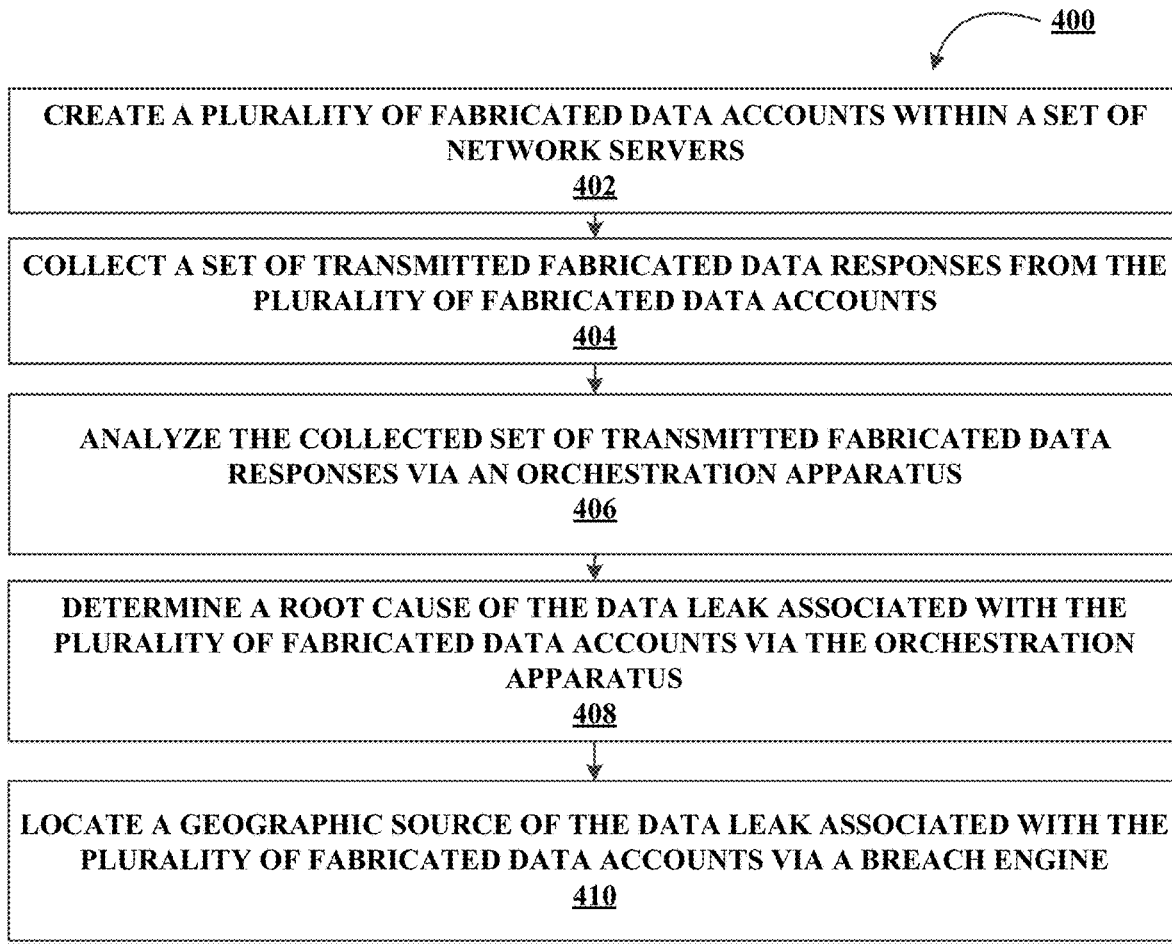
Figure 5:
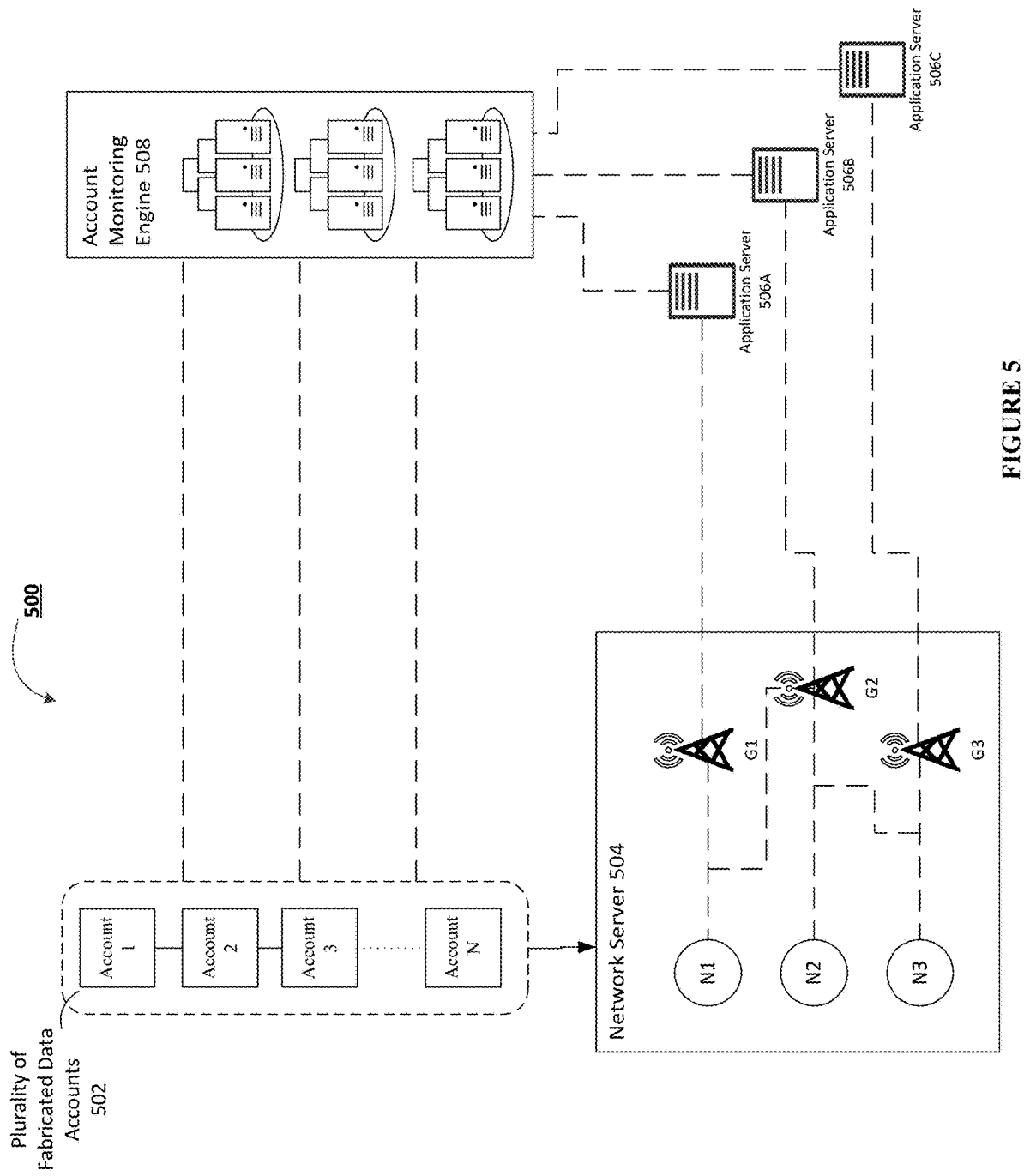
Figure 6A:
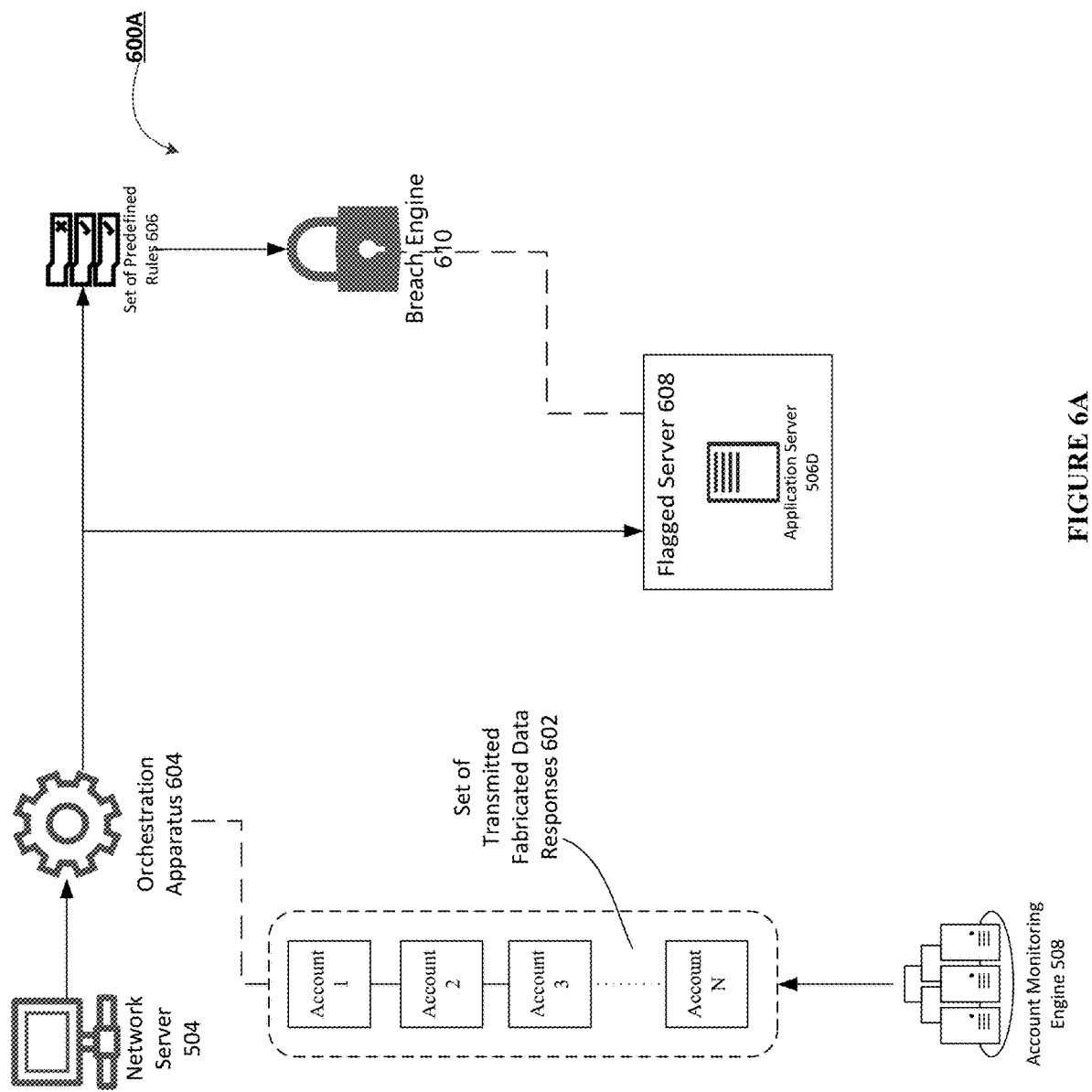
Figure 6B:
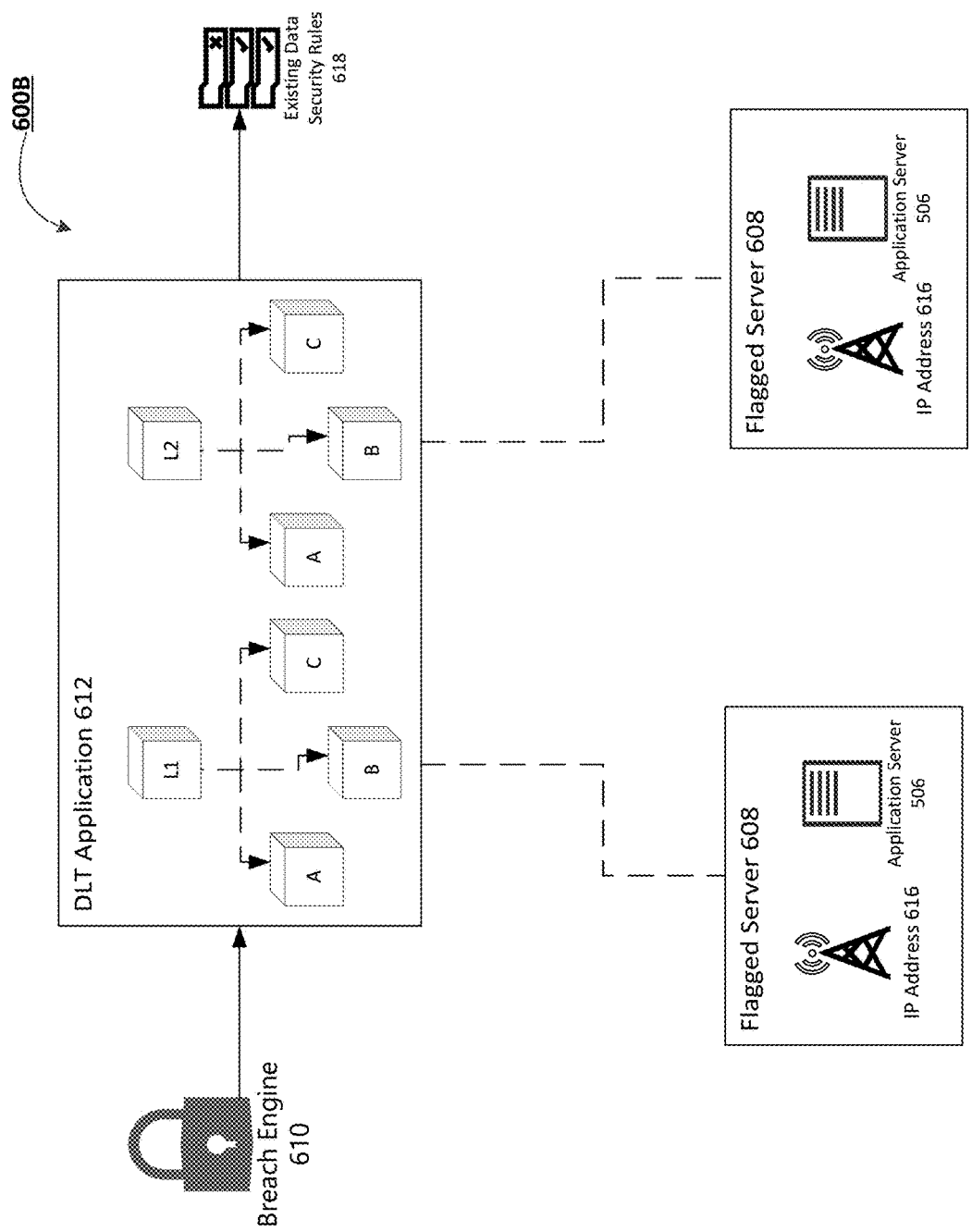

FIGS. 1A-1C illustrates technical components of an exemplary distributed computing environment for systems and methods to detect data leaks via a distributed data orchestration apparatus and transmitted fabricated data responses in accordance with an embodiment of the disclosure;

FIGS. 2A-2B illustrate an exemplary distributed ledger technology (DLT) architecture, in accordance with an embodiment of the disclosure;

FIG. 3 illustrates an exemplary machine learning (ML) subsystem architecture, in accordance with an embodiment of the disclosure;

FIG. 4 illustrates a process flow for detection of data leaks via a distributed data orchestration apparatus and transmitted fabricated data responses in accordance with an embodiment of the disclosure;

FIG. 5 illustrates an exemplary data flow architecture in accordance with an embodiment of the disclosure; and FIG. 6A-6B illustrates an exemplary data leak detection and diagnosis architecture leveraging DLT and geographic location detection in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Analyzing and determining the source of a data leak can improve security to prevent the occurrence of future data leaks. While the occurrence of data leaks may result in damage and unauthorized access by malicious actors, fabricated data accounts may be utilized to determine the exposure of data without the danger of releasing "valuable" or "real" data (e.g., fake data that will not have negative consequences if leaked). If the data within the fabricated data accounts is released, the location of the stored data as well as the interactions of the fabricated data accounts may be identified. An orchestration apparatus may then be used to analyze the leaked data, locate where the leak occurred, and predict how the leak occurred.

Data leaks within a network server or entity can expose individuals and operations within said entity to malicious actors. Further, vulnerabilities within a given network server may not be evident until after a data leak has occurred, at which point data within the server has already been exposed. Data security may not be able to be upgraded or strengthened after a data leak if the source of the data leak and the location in which the data leak occurred is unknown. Prevention and detection of data leaks within an entity or network server may be enhanced if the source of data leaks were found and analyzed before a leak occurs.

Fabricated data accounts may be created, strategically placed, and then intentionally exposed to determine the data security associated with a server and/or network. Fabricated data within the fabricated data accounts (e.g., phone numbers, email addresses, account numbers, etc.) may provide an indication of the security of the fabricated data account, as receiving messages/attempted contact through the information on the account may indicate the presence of a data leak. When the leak occurs, the location of the leak and the leak contents may be identified by matching the information within the fabricated data account to the location in which the account was stored. A smart orchestration apparatus (e.g., a form of machine learning) may further be used to diagnose the root cause/source of the data leak, providing insight into how further data leaks may be prevented. Identification of the leak location and diagnosing the source of the leak using fabricated data may safely promote security of data and knowledge of how current data leaks occur without exposing valuable data.

Accordingly, the present disclosure describes detecting data leaks via a distributed orchestration apparatus and transmitted fabricated data responses. A set of fabricated accounts (e.g., a plurality of fabricated data accounts) may be created within a set of network servers to act as a proxy detection for data leaks within the set of network servers. The set of fabricated accounts may be connected to an account monitoring engine, which may map interactions associated with the fabricated data accounts. The fabricated data accounts may be comprised of fabricated information, which if utilized may indicate a data leak (e.g., messages from phone numbers or emails from email addresses within the fabricated data accounts are received). The set of transmitted fabricated data responses (the information received through fabricated data accounts), may then be analyzed by an orchestration apparatus (a form of machine learning) to predict/determine the root cause of the data leak. Upon identification of the root cause of the data leak, the geographic source of the data leak may be located and recorded using distributed ledger technology, and existing data security rules may be updated to reflect the flagged server and potential data leak.

What is more, the present disclosure provides a technical solution to a technical problem. As described herein, the technical problem includes detection of data leaks within a distributed data apparatus. The technical solution presented herein allows for detection of data leaks via a distributed orchestration apparatus and transmitted fabricated data responses. In particular, detection of data leaks via a distributed orchestration apparatus and transmitted fabricated data responses is an improvement over existing solutions to the detection of data leaks within a distributed data apparatus, (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for detecting data leaks via a distributed data orchestration apparatus and transmitted fabricated data responses, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIGS. 2A-2B illustrate an exemplary distributed ledger technology (DLT) architecture, in accordance with an embodiment of the invention. DLT may refer to the protocols and supporting infrastructure that allow computing devices (peers) in different locations to propose and validate transactions and update records in a synchronized way across a network. Accordingly, DLT is based on a decentralized model, in which these peers collaborate and build trust over the network. To this end, DLT involves the use of potentially peer-to-peer protocol for a cryptographically secured distributed ledger of transactions represented as transaction objects that are linked. As transaction objects each contain information about the transaction object previous to it, they are linked with each additional transaction object, reinforcing the ones before it. Therefore, distributed ledgers are resistant to modification of their data because once recorded, the data in any given transaction object cannot be altered retroactively without altering all subsequent transaction objects.

To permit transactions and agreements to be carried out among various peers without the need for a central authority or external enforcement mechanism, DLT uses smart contracts. Smart contracts are computer code that automatically executes all or parts of an agreement and is stored on a DLT platform. The code can either be the sole manifestation of the agreement between the parties or might complement a traditional text-based contract and execute certain provisions, such as transferring funds from Party A to Party B. The code itself is replicated across multiple nodes (peers) and, therefore, benefits from the security, permanence, and immutability that a distributed ledger offers. That replication also means that as each new transaction object is added to the distributed ledger, the code is, in effect, executed. If the parties have indicated, by initiating a transaction, that certain parameters have been met, the code will execute the step triggered by those parameters. If no such transaction has been initiated, the code will not take any steps.

Various other specific-purpose implementations of distributed ledgers have been developed. These include distributed domain name management, decentralized crowd-funding, synchronous/asynchronous communication, decentralized real-time ride sharing and even a general purpose deployment of decentralized applications. In some embodiments, a distributed ledger may be characterized as a public distributed ledger, a consortium distributed ledger, or a private distributed ledger. A public distributed ledger is a distributed ledger that anyone in the world can read, anyone in the world can send transactions to and expect to see them included if they are valid, and anyone in the world can participate in the consensus process for determining which transaction objects get added to the distributed ledger and what the current state each transaction object is. A public distributed ledger is generally considered to be fully decentralized. On the other hand, fully private distributed ledger is a distributed ledger whereby permissions are kept centralized with one entity. The permissions may be public or restricted to an arbitrary extent. And lastly, a consortium distributed ledger is a distributed ledger where the consensus process is controlled by a pre-selected set of nodes; for example, a distributed ledger may be associated with a number of member institutions (say 15), each of which operate in such a way that the at least 10 members must sign every transaction object in order for the transaction object to be valid. The right to read such a distributed ledger may be public or restricted to the participants. These distributed ledgers may be considered partially decentralized.

As shown in FIG. 2A, the exemplary DLT architecture 200 includes a distributed ledger 204 being maintained on multiple devices (nodes) 202 that are authorized to keep track of the distributed ledger 204. For example, these nodes 202 may be computing devices such as system 130 and client device(s) 140. One node 202 in the DLT architecture 200 may have a complete or partial copy of the entire distributed ledger 204 or set of transactions and/or transaction objects 204A on the distributed ledger 204. Transactions are initiated at a node and communicated to the various nodes in the DLT architecture. Any of the nodes can validate a transaction, record the transaction to its copy of the distributed ledger, and/or broadcast the transaction, its validation (in the form of a transaction object) and/or other data to other nodes.

As shown in FIG. 2B, an exemplary transaction object 204A may include a transaction header 206 and a transaction object data 208. The transaction header 206 may include a cryptographic hash of the previous transaction object 206A, a nonce 206B—a randomly generated 32-bit whole number when the transaction object is created, cryptographic hash of the current transaction object 206C wedded to the nonce 206B, and a time stamp 206D. The transaction object data 208 may include transaction information 208A being recorded. Once the transaction object 204A is generated, the transaction information 208A is considered signed and forever tied to its nonce 206B and hash 206C. Once generated, the transaction object 204A is then deployed on the distributed ledger 204. At this time, a distributed ledger address is generated for the transaction object 204A, i.e., an indication of where it is located on the distributed ledger 204 and captured for recording purposes. Once deployed, the transaction information 208A is considered recorded in the distributed ledger 204.

FIG. 3 illustrates an exemplary machine learning (ML) subsystem architecture 300, in accordance with an embodiment of the invention. The machine learning subsystem 300 may include a data acquisition engine 302, data ingestion engine 310, data pre-processing engine 316, ML model tuning engine 322, and inference engine 336.

The data acquisition engine 302 may identify various internal and/or external data sources to generate, test, and/or integrate new features for training the machine learning model 324. These internal and/or external data sources 304, 306, and 308 may be initial locations where the data originates or where physical information is first digitized. The data acquisition engine 302 may identify the location of the data and describe connection characteristics for access and retrieval of data. In some embodiments, data is transported from each data source 304, 306, or 308 using any applicable network protocols, such as the File Transfer Protocol (FTP), Hyper-Text Transfer Protocol (HTTP), or any of the myriad Application Programming Interfaces (APIs) provided by websites, networked applications, and other services. In some embodiments, the these data sources 304, 306, and 308 may include Enterprise Resource Planning (ERP) databases that host data related to day-to-day business activities such as accounting, procurement, project management, exposure management, supply chain operations, and/or the like, mainframe that is often the entity's central data processing center, edge devices that may be any piece of hardware, such as sensors, actuators, gadgets, appliances, or machines, that are programmed for certain applications and can transmit data over the internet or other networks, and/or the like. The data acquired by the data acquisition engine 302 from these data sources 304, 306, and 308 may then be transported to the data ingestion engine 310 for further processing.

Depending on the nature of the data imported from the data acquisition engine 302, the data ingestion engine 310 may move the data to a destination for storage or further analysis. Typically, the data imported from the data acquisition engine 302 may be in varying formats as they come from different sources, including RDBMS, other types of databases, S3 buckets, CSVs, or from streams. Since the data comes from different places, it needs to be cleansed and transformed so that it can be analyzed together with data from other sources. At the data ingestion engine 302, the data may be ingested in real-time, using the stream processing engine 312, in batches using the batch data warehouse 314, or a combination of both. The stream processing engine 312 may be used to process continuous data stream (e.g., data from edge devices), i.e., computing on data directly as it is received, and filter the incoming data to retain specific portions that are deemed useful by aggregating, analyzing, transforming, and ingesting the data. On the other hand, the batch data warehouse 314 collects and transfers data in batches according to scheduled intervals, trigger events, or any other logical ordering.

In machine learning, the quality of data and the useful information that can be derived therefrom directly affects the ability of the machine learning model 324 to learn. The data pre-processing engine 316 may implement advanced integration and processing steps needed to prepare the data for machine learning execution. This may include modules to perform any upfront, data transformation to consolidate the data into alternate forms by changing the value, structure, or format of the data using generalization, normalization, attribute selection, and aggregation, data cleaning by filling missing values, smoothing the noisy data, resolving the inconsistency, and removing outliers, and/or any other encoding steps as needed.

In addition to improving the quality of the data, the data pre-processing engine 316 may implement feature extraction and/or selection techniques to generate training data 318. Feature extraction and/or selection is a process of dimensionality reduction by which an initial set of data is reduced to more manageable groups for processing. A characteristic of these large data sets is a large number of variables that require a lot of computing resources to process. Feature extraction and/or selection may be used to select and/or combine variables into features, effectively reducing the amount of data that must be processed, while still accurately and completely describing the original data set. Depending on the type of machine learning algorithm being used, this training data 318 may require further enrichment. For example, in supervised learning, the training data is enriched using one or more meaningful and informative labels to provide context so a machine learning model can learn from it. For example, labels might indicate whether a photo contains a bird or car, which words were uttered in an audio recording, or if an x-ray contains a tumor. Data labeling is required for a variety of use cases including computer vision, natural language processing, and speech recognition. In contrast, unsupervised learning uses unlabeled data to find patterns in the data, such as inferences or clustering of data points.

The ML model tuning engine 322 may be used to train a machine learning model 324 using the training data 318 to make predictions or decisions without explicitly being programmed to do so. The machine learning model 324 represents what was learned by the selected machine learning algorithm 320 and represents the rules, numbers, and any other algorithm-specific data structures required for classification. Selecting the right machine learning algorithm may depend on a number of different factors, such as the problem statement and the kind of output needed, type and size of the data, the available computational time, number of features and observations in the data, and/or the like. Machine learning algorithms may refer to programs (math and logic) that are configured to self-adjust and perform better as they are exposed to more data. To this extent, machine learning algorithms are capable of adjusting their own parameters, given feedback on previous performance in making prediction about a dataset.

The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like.

To tune the machine learning model, the ML model tuning engine 322 may repeatedly execute cycles of experimentation 326, testing 328, and tuning 330 to optimize the performance of the machine learning algorithm 320 and refine the results in preparation for deployment of those results for consumption or decision making. To this end, the ML model tuning engine 322 may dynamically vary hyperparameters each iteration (e.g., number of trees in a tree-based algorithm or the value of alpha in a linear algorithm), run the algorithm on the data again, then compare its performance on a validation set to determine which set of hyperparameters results in the most accurate model. The accuracy of the model is the measurement used to determine which set of hyperparameters is best at identifying relationships and patterns between variables in a dataset based on the input, or training data 318. A fully trained machine learning model 332 is one whose hyperparameters are tuned and model accuracy maximized.

The trained machine learning model 332, similar to any other software application output, can be persisted to storage, file, memory, or application, or looped back into the processing component to be reprocessed. More often, the trained machine learning model 332 is deployed into an existing production environment to make practical business decisions based on live data 334. To this end, the machine learning subsystem 300 uses the inference engine 336 to make such decisions. The type of decision-making may depend upon the type of machine learning algorithm used. For example, machine learning models trained using supervised learning algorithms may be used to structure computations in terms of categorized outputs (e.g., C_1, C_2 . . . . C_n 338) or observations based on defined classifications, represent possible solutions to a decision based on certain conditions, model complex relationships between inputs and outputs to find patterns in data or capture a statistical structure among variables with unknown relationships, and/or the like. On the other hand, machine learning models trained using unsupervised learning algorithms may be used to group (e.g., C_1, C_2 . . . . C_n 338) live data 334 based on how similar they are to one another to solve exploratory challenges where little is known about the data, provide a description or label (e.g., C_1, C_2 . . . . C_n 338) to live data 334, such as in classification, and/or the like. These categorized outputs, groups (clusters), or labels are then presented to the user input system 130. In still other cases, machine learning models that perform regression techniques may use live data 334 to predict or forecast continuous outcomes.

It will be understood that the embodiment of the machine learning subsystem 300 illustrated in FIG. 3 is exemplary and that other embodiments may vary. As another example, in some embodiments, the machine learning subsystem 300 may include more, fewer, or different components.

FIG. 4 illustrates a process flow 400 for systems and methods to detect data leaks via a distributed data orchestration apparatus and transmitted fabricated data responses. In some embodiments, detecting data leaks via a distributed data orchestration apparatus (e.g., similar to the one or more of the systems described herein with respect to FIGS. 1A-1C, 2A-2B, and 3) may perform one or more of the steps of process flow 400.

As shown in Block 402, the process flow 400 may include the step of creating a plurality of fabricated data accounts within a set of network servers. The plurality of fabricated data accounts may be connected to an account monitoring engine. Creation of the plurality of fabricated data accounts may be conducted through a low power wide area networking protocol designed to connect devices to a network secure channel. The plurality of fabricated data accounts may further be created to comprise fabricated data accounts placed in a plurality of networks, servers, applications, sites, and the like.

In some embodiments, a fabricated data account within the set of fabricated data accounts may include but may not be limited to fabricated information including names, phone numbers, email addresses, messaging accounts, and/or other forms of communication. The plurality of fabricated data accounts may include information associated with a form of contact. For instance, the plurality of fabricated data accounts may include information that identifies an individual fabricated data account and may enable communications with the individual fabricated data account within the set. The information within a fabricated data account may act as a trigger to indicate the data within the account has been leaked. In other words, since the data is not used for a "real" function, any messages, phone calls, notifications, and/or the like received by the fabricated data account may indicate that the information within the fabricated data account experienced a data leak. Fabricated data accounts may be placed/created in environments in which non-fabricated data accounts (e.g., data accounts associated with real entities, groups, and/or people) may be placed/created. In some embodiments, the set of fabricated data accounts may be created outside the set of network servers and registered/placed in the set of network servers after creation.

In some embodiments, the plurality of fabricated data accounts may be exposed within a network server. The plurality of fabricated data accounts may be placed in a plurality of servers, networks, and/or applications. A fabricated data account within the network server may be used as an indicator to determine if the data associated with a fabricated data account has been leaked. For instance, a message received through the fabricated data account (i.e., a call is made to the fabricated phone number, an email is received through a fabricated email address, etc.) may indicate that the information within a fabricated data account has been leaked, and a data leak within the network the fabricated data account was associated with has occurred. The placement of a fabricated data account may determine the location, area, network, server, and/or the like of where the data leak occurred. For instance, if account A was placed in network B, and a phone call is conducted using a phone number associated with Account A, a data leak may be found in network B.

In some embodiments, fabricated data accounts within the plurality of fabricated data accounts may be placed in nodes selected in a star topology format. In other words, fabricated data accounts may be connected to a central node to expose potential data leaks. For instance, a fabricated data account may be placed within a node of a network to observe if a potential data leak is experienced. If data associated with the fabricated data account is leaked, the connections to the node in which the fabricated data account is connected to may have experienced a similar data leak. The star topology format may enable a connection between nodes and a central hub. The plurality of fabricated data accounts may be created/placed in an interconnected topology, enabling communication, and diversifying the locations within the set of network servers to increase the likelihood of detecting possible data leaks.

In some embodiments, the account monitoring engine may store interactions associated with the plurality of fabricated data accounts. For instance, interactions created, conducted, and/or involving information within a fabricated data account may be received (i.e., an attempted phone call is made to a number within the fabricated data accounts), which may be recorded within the account monitoring engine. The account monitoring engine may collect and store interactions and/or a set of transmitted fabricated data responses, as described in greater detail below.

As shown in Block 404, the process flow 400 may include the step of collecting a set of transmitted fabricated data responses from the plurality of fabricated data accounts. The set of transmitted fabricated data responses may be mapped within the account monitoring engine. The set of transmitted fabricated data responses may comprise messages, attempted phone calls, emails, alerts, notifications, and/or the like transmitted to the fabricated data account. For instance, an email received by account C in network D may indicate that the fabricated data account and accounts placed within network D may be experiencing a data leak. Collections of the transmitted fabricated data responses may enable analysis of the data leak. For instance, if emails associated with the fabricated data account are received by the email address associated with the fabricated data account, the emails received may be collected, mapped, and analyzed to determine the source of the data leak. The collection process may be conducted through transmission of the fabricated data responses to an account monitoring engine, which may then be subjected to further analysis by the orchestration apparatus.

In some embodiments, the account monitoring engine may map interactions associated with the plurality of fabricated data accounts based on feeds of the fabricated data accounts. For instance, a fabricated data account within the set may comprise data capable of conducting a transaction (e.g., transaction account numbers, card numbers, data associated with entities capable of conducting transactions), which may be exposed to channels, websites, networks, servers, and the like. Interactions involving the information within the set of fabricated data accounts may be used to map which accounts, servers, networks, and channels may have experienced a data leak, and identify the leaked fabricated data accounts from the set of transmitted fabricated data responses. The fabricated data within the set of fabricated data accounts may be exposed through the surface web, deep web, and dark web.

As shown in Block 406, the process flow 400 may include the step of analyzing the collected set of transmitted fabricated data responses via an orchestration apparatus. Analysis of the collected set of transmitted fabricated data responses may comprise reviewing transmitted fabricated data responses, evaluating the source of the transmitted data responses, and determining the extent of the data leak associated with the collected set of transmitted fabricated data responses. For instance, analysis of the transmitted fabricated data responses may be mapped within an account monitoring engine. The account monitoring engine may activate an orchestration apparatus, which may analyze a set of networking clusters and patching pattern of breached servers and source network. Analysis of the set of networking clusters and patching pattern may be conducted through flagging suspected servers through a plurality of sources.

In some embodiments, the orchestration apparatus may be developed to identify breach activity through analysis of networking clusters and patching patterns associated with breached servers and networks. The networking clusters within the breached servers and networks may be clusters that can be identified upon a breach. For instance, the analysis of the networking clusters may include receiving the set of fabricated data responses from the plurality of fabricated data accounts. The orchestration apparatus may analyze the patching pattern associated with the data leak. The orchestration apparatus may utilize parts of the exemplary machine learning subsystem architecture described in FIG. 3. In other words, the machine learning subsystem architecture 300 described in FIG. 3 may be used to analyze the data leak received through the set of transmitted fabricated data responses and predict how the data leak occurred based on what data was leaked and where the data leak occurred.

In some embodiments, the set of transmitted fabricated data responses may be recorded within a distributed ledger application. The distributed ledger application may be a form of DLT, as described in FIGS. 2A-2B. The distributed ledger application may record the collected messages, emails, attempted phone calls, interactions associated with the plurality of fabricated data accounts, and the like received from the plurality of fabricated data accounts. The distributed ledger application may be used to record actions, interactions, transfers, and information collected through the orchestration apparatus.

As shown in Block 408, the process flow 400 may include the step of determining the root cause of the data leak associated with the plurality of fabricated data accounts via the orchestration apparatus. Determination of the root cause of the data leak through the orchestration apparatus may be an evaluation, estimation, calculation, and/or prediction of the root cause of the data leak using the orchestration apparatus. The orchestration apparatus may be a form of machine learning as described in FIG. 3. For instance, the orchestration apparatus may analyze the collected fabricated data responses from the plurality of fabricated data accounts to compare responses, the sources of the responses, and the information associated with the source of the transmitted fabricated data responses. The orchestration apparatus may define a set of predefined rules to monitor and prevent data leaks that may occur based on previously encountered leaks.

As shown in Block 410, the process flow 400 may include the step of locating a geographic source of the data leak associated with the fabricated data accounts via a breach engine. The geographic source of the data leak may be located using the source of the data leak associated with the plurality of fabricated accounts.

In some embodiments, locating the geographic source of the data leak may comprise using the analyzed set of transmitted fabricated data responses to determine the location from which the data leak originated. For instance, the geographic source of the data leak may be determined through utilizing the IP addresses of the network servers that may be associated with the data leak. The data leak may be analyzed to determine the source of a potential data leak through the associated fabricated account.

In some embodiments, the breach engine may store the inputs from the smart orchestration apparatus and information associated with a flagged network server (e.g., a network server wherein a data leak has been identified). Information associated with the flagged network server may include but may not be limited to an internet protocol address (IP address), location of the data leak within the network server, and extent of the experienced data leak. The breach engine may determine the geographic location of the source of the data leaks using the information associated with the flagged network server, as described previously.

In some embodiments, determining the root cause of the data leak associated with the plurality of fabricated data accounts via the orchestration apparatus may include analyzing a set of network clusters and patching patterns to predict the source of the data leak associated with the fabricated data accounts. For instance, determination of the root cause of the data leak may utilize embodiments of the machine learning architecture described in FIG. 3 (e.g., the machine learning subsystem 300) to determine the root cause of the data leak.

In some embodiments, upon locating the geographic source of the data leak and determining the root cause of the data leak, a set of predefined security rules may be updated in accordance with the detected data leak. For instance, upon identification of a flagged server, potential data leak, and/or security concern, the predefined security rules may be changed to reflect the identified server, potential data leak, and/or security concern. E.g., storage within the identified server may be restricted/halted, data security protocols may be strengthened/updated in proportion to the extent of the identified data leak.

FIG. 5 illustrates an exemplary data flow architecture to detect data leaks via a distributed data orchestration apparatus and fabricated data responses. Various systems and components discussed in reference to the exemplary high level data flow architecture 500 demonstrated in FIG. 5 may be carried out by the various components of the distributed computing environment 100 discussed herein (e.g., the systems 130, one or more end-point devices 140, etc.) as well as components described in FIGS. 2A-2B, 3, and 4.

As shown in FIG. 5, a plurality of fabricated data accounts 502 may be created and exposed within a set of network servers 504. The plurality of fabricated data accounts 502 may be exposed within the network servers 504 strategically (e.g., a fabricated data account may be created within network servers suspected of data leaks, with corresponding information within the account that identifies which network server the account was placed). The set of network servers 504 may be comprised of a set of nodes, a set of gateways, and a set of servers. The set of gateways within the set of network servers may be connected, enabling communication and placement of the plurality of fabricated data accounts 502 within the network. The plurality of fabricated data accounts 502 when exposed within the set of network servers may be subjected to a data leak, wherein information stored within an account within the plurality of data accounts may not be secured within the set of network servers. The information stored within an account may be used to track the location of the data leak within the network server (e.g., if the email address associated with Account 1 was placed in N1, then a data leak may be present in N1). Exposing the plurality of fabricated accounts 502 within the set of network servers 504 may be processed through a plurality of gateways within the set of network servers. For instance, Account 2 placed in N2 may be processed through a gateway (e.g., gateway G2), before undergoing message deduplication and transference to an application server 506 (e.g., application server 506B). The application server 506 may then transmit the set of fabricated data responses to the account monitoring engine 508. The set of fabricated data responses may be stored within the account monitoring engine 508, which may record the set of transmitted fabricated data responses. The set of transmitted fabricated data responses may be analyzed by the orchestration system, as described in greater detail below. The account monitoring engine 508 may store/map interactions associated with the plurality of fabricated data accounts 502. Storage of interactions associated with the plurality of fabricated data accounts 502 within the account monitoring engine 508 may include incoming information, messages, calls, emails, and/or actions associated with the plurality of fabricated data accounts. In other words, feedback from fabricated data may be recorded within the account monitoring engine 508 to track which accounts have experienced the data leak, where the data leak occurred, and the extent of the data leak.

Turning now to FIGS. 6A-6B, which illustrate an exemplary data leak architecture leveraging DLT and geographic detection. Various systems and components discussed in reference to the exemplary data leak detection architecture 600A and exemplary DLT and geographic locator architecture 600B shown in FIG. 6 may be carried out by the various components of the distributed computing environment 100 discussed herein (e.g., the systems 130, one or more endpoint devices 140, etc.) as well as components described in FIGS. 2A-2B, 3, 4, and 5.

As shown in FIG. 6A, the account monitoring engine 508 may store the set of transmitted fabricated data responses 602 which may be transmitted to the orchestration apparatus 604. The orchestration apparatus 604 may be a form of machine learning subsystem architecture 200 described in FIG. 2. The orchestration apparatus 604 may analyze the set of transmitted fabricated data responses 602 to determine the location and extent of a data leak given the transmitted fabricated data responses. Using the information associated with individual accounts, the location of the network server in which the leak occurred may be identified, while the machine learning of the orchestration apparatus 604 may diagnose the root cause of the data leak associated with the plurality of fabricated data accounts 502. The root cause of the data leak may be determined from the information associated with an individual fabricated data account within the plurality of fabricated data accounts 502. The orchestration apparatus 604 may provide an estimate/prediction of the root cause of the data leak based on the set of transmitted fabricated responses and the breaches detected. The orchestration apparatus 604 upon diagnosing the root cause of the data leak may flag a server within the network server 504 as a potential data leak location. The flagged server 608 may be comprised of at least one server breach in association with the application server 506D. The at least one server breach may be identified by the data leak originating from the plurality of fabricated data accounts 502. Upon determination of the root cause of the data leak by the orchestration apparatus 604, the set of predefined rules 606 may be adjusted based on the identified data leak. The set of predefined rules 606 may be comprised of procedures, protocols, and policies associated with monitoring data leaks, data storage practices, and preventative data leak procedures. For instance, the set of predefined rules 606 may be updated to prohibit data storage in a flagged server 608 due to potential data leaks. In another instance, the data leak may be caused by storing data in a given format, and the set of predefined rules 606 may be updated to define the formats in which data may be stored. Upon updating the set of predefined rules 606, the breach engine 610 may receive inputs from the orchestration apparatus 604 and the flagged server 608. The breach engine 610 may locate a geographic source of the data leak associated with plurality of fabricated data accounts, as described in greater detail below.

Turning now to FIG. 6B, the breach engine 610 may store the inputs from the orchestration apparatus 604 and information associated with the network server 504 to enable identification of the geographic location associated with a given data leak. Information stored within the breach engine 610 may be used to locate the geographic location associated with the data leak. The geographic location associated with the data leak may be determined through the information stored within the breach engine 610. For instance, the IP address 616 of the network server 504, the IP address of the application server 506, and/or other information associated with flagged servers 608. The information from the breach engine 610 as well as the information related to the flagged server 608 may be recorded on a DLT application 612. The DLT application 612 may record actions and information provided, as described previously in FIGS. 2A-2B. Upon recording of the actions and information within the DLT application 612, the existing data security rules 618 (data security procedures, protocols, and policies in place) may be updated to reflect the identified data leaks, flagged servers, and identified root cause of the data leak.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system to detect data leaks via a distributed data orchestration apparatus and transmitted fabricated data responses, the system comprising:
   a memory device with computer-readable program code stored thereon;
   at least one processing device coupled to the at least one non-transitory storage device, wherein the at least one processing device is configured to:
      create a plurality of fabricated data accounts via an arbitrary routing mechanism implemented through a low power wide area networking protocol within a set of network servers,
      wherein the plurality of fabricated data accounts are connected to an account monitoring engine,
      wherein the plurality of fabricated data accounts are exposed within the set of network servers;
      collect a set of transmitted fabricated data responses from the plurality of fabricated data accounts,
      wherein the plurality of transmitted fabricated data responses are mapped within the account monitoring engine;
      analyze the collected set of transmitted fabricated data responses via an orchestration apparatus configured to identify information associated with the set of network servers comprising breached clusters, patching patterns, and flagged servers, wherein analysis via the orchestration apparatus determines a data leak associated with the plurality of fabricated data accounts;

determine a root cause of the data leak associated with the plurality of fabricated data accounts through analyzed information associated with the set of network servers via the orchestration apparatus; and locate a geographic source of the data leak associated with the plurality of fabricated data accounts via a breach engine, wherein the geographic source of the data leak is located using the root cause of the data leak associated with the plurality of fabricated accounts.

2. The system of claim 1, wherein the account monitoring engine stores interactions associated with the plurality of fabricated data accounts.

3. The system of claim 2, wherein the set of transmitted fabricated data responses from the plurality of fabricated data accounts are recorded within a distributed ledger application.

4. The system of claim 1, wherein determining the root cause of the data leak associated with the plurality of fabricated data accounts via the orchestration apparatus comprises:

analyzing a set of network clusters and patching patterns to predict the source of the data leak associated with the fabricated data accounts.

5. The system of claim 1, wherein determining the root cause of the data leak further comprises updating a set of predefined security rules associated with data storage within the set of network servers.

6. The system of claim 1, wherein the plurality of fabricated data accounts within the set of network servers are created in a star topology format.

7. The system of claim 1, wherein the set of transmitted fabricated data responses comprise emails, messages, and attempted calls using data associated with the plurality of fabricated data accounts.

8. A computer program product for detecting data leaks via a distributed data orchestration apparatus and transmitted fabricated data responses, the computer program product comprising at least one non-transitory computer-readable medium having computer-readable program code portions embodied therein, the computer-readable program code portions comprising:

an executable portion configured to create a plurality of fabricated data accounts within a set of network servers via an arbitrary routing mechanism implemented through a low power wide area networking protocol, wherein the plurality of fabricated data accounts are connected to an account monitoring engine, wherein the plurality of fabricated data accounts are exposed within the set of network servers;

an executable portion configured to collect a set of transmitted fabricated data responses from the plurality of fabricated data accounts, wherein the plurality of transmitted fabricated data responses are mapped within the account monitoring engine;

an executable portion configured to analyze the collected set of transmitted fabricated data responses via an orchestration apparatus configured to identify information associated with the set of network servers comprising breached clusters, patching patterns, and flagged servers, wherein analysis via the orchestration apparatus determines a data leak associated with the plurality of fabricated data accounts;

an executable portion configured to determine a root cause of the data leak associated with the plurality of fabricated data accounts through analyzed information associated with the set of network servers via the orchestration apparatus; and an executable portion configured to locate a geographic source of the data leak associated with the plurality of fabricated data accounts via a breach engine, wherein the geographic source of the data leak is located using the root cause of the data leak associated with the plurality of fabricated data accounts.

9. The computer program product of claim 8, wherein the account monitoring engine stores interactions associated with the plurality of fabricated data accounts.

10. The computer program product of claim 9, wherein the set of transmitted fabricated data responses from the plurality of fabricated data accounts are recorded within a distributed ledger application.

11. The computer program product of claim 8, wherein determining the root cause of the data leak associated with the fabricated data accounts via the orchestration apparatus comprises:

analyzing a set of network clusters and patching patterns to predict the source of the data leak associated with the fabricated data accounts.

12. The computer program product of claim 8, wherein determining the root cause of the data leak further comprises updating a set of predefined security rules associated with data storage within the set of network servers.

13. The computer program product of claim 8, wherein the plurality of fabricated data accounts within the set of network servers are created in a star topology format.

14. The computer program product of claim 8, wherein the set of transmitted fabricated data responses comprise emails, messages, and attempted calls using data associated with the plurality of fabricated data accounts.

15. A computer-implemented method to detect data leaks via a distributed data orchestration apparatus and transmitted fabricated data responses, the method comprising:

creating a plurality of fabricated data accounts within a set of network servers via an arbitrary routing mechanism implemented through a low power wide area networking protocol, wherein the plurality of fabricated data accounts are connected to an account monitoring engine, wherein the plurality of fabricated data accounts are exposed within the set of network servers;

collecting a set of transmitted fabricated data responses from the plurality of fabricated data accounts;

wherein the plurality of fabricated data responses are mapped within the account monitoring engine;

analyzing the collected set of transmitted fabricated data responses via an orchestration apparatus configured to identify information associated with the set of network servers comprising breached clusters, patching patterns, and flagged servers, wherein analysis via the orchestration apparatus determines a data leak associated with the plurality of fabricated data accounts;

determining a root cause of the data leaks associated with the plurality of fabricated data accounts through analyzed information associated with the set of network servers via the orchestration apparatus; and locating a geographic source of the data leak associated with the plurality of fabricated data accounts via a breach engine,
wherein the geographic source of the data leak is located using the root cause of the data leak associated with the plurality of fabricated accounts.

16. The computer-implemented method of claim 15, wherein the set of transmitted fabricated data responses from the plurality of fabricated data accounts are recorded within a distributed ledger application.

17. The computer-implemented method of claim 16, wherein the account monitoring engine stores interactions associated with the plurality of fabricated data accounts.

18. The computer-implemented method of claim 15, wherein determining the root cause of the data leak further comprises updating a set of predefined security rules associated with data storage within the set of network servers.

19. The computer-implemented method of claim 15, the plurality of fabricated data accounts within the set of network servers are created in a star topology format.

20. The computer-implemented method of claim 15, wherein the set of transmitted fabricated data responses comprise emails, messages, and attempted calls using data associated with the plurality of fabricated data accounts.

\* \* \* \* \*